(12) United States Patent
Liu et al.

(10) Patent No.: US 7,734,633 B2
(45) Date of Patent: Jun. 8, 2010

(54) LISTWISE RANKING

(75) Inventors: Tie-Yan Liu, Beijing (CN); Hang Li, Beijing (CN); Tao Qin, Beijing (CN); Zhe Cao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 11/874,813

(22) Filed: Oct. 18, 2007

(65) Prior Publication Data

US 2009/0106222 A1    Apr. 23, 2009

(51) Int. Cl.
G06F 17/30    (2006.01)
(52) U.S. Cl. .................................. 707/749; 707/752
(58) Field of Classification Search .................. 707/1–7
See application file for complete search history.

(56) References Cited

U.S. PATENT DOCUMENTS

| | | | |
|---|---|---|---|
| 5,752,241 A * | 5/1998 | Cohen | 707/3 |
| 6,775,664 B2 | 8/2004 | Lang et al. | |
| 7,424,469 B2 * | 9/2008 | Ratnaparkhi | 707/3 |
| 7,472,096 B2 * | 12/2008 | Burges et al. | 706/20 |
| 7,593,934 B2 * | 9/2009 | Li et al. | 707/5 |
| 2005/0149504 A1 * | 7/2005 | Ratnaparkhi | 707/3 |
| 2005/0210025 A1 * | 9/2005 | Dalton et al. | 707/5 |
| 2006/0026152 A1 | 2/2006 | Zeng et al. | |
| 2006/0074910 A1 * | 4/2006 | Yun et al. | 707/7 |
| 2006/0195406 A1 | 8/2006 | Burges et al. | |
| 2006/0248031 A1 * | 11/2006 | Kates et al. | 706/25 |
| 2007/0078849 A1 | 4/2007 | Slothouber | |
| 2007/0094171 A1 | 4/2007 | Burges et al. | |
| 2007/0094285 A1 | 4/2007 | Agichtein et al. | |
| 2007/0106659 A1 | 5/2007 | Lu et al. | |
| 2008/0208836 A1 * | 8/2008 | Zheng et al. | 707/5 |

FOREIGN PATENT DOCUMENTS

GB    EP1006458 A1    6/2000

OTHER PUBLICATIONS

Seinjuti Chakraborty, Learning to Rank Using Mixture of Experts and Matching Loss Functions, Department of Computer Science University of California, Sandta Cruz, Jun. 2009, p. 1-15.*

Agichtein, et al., "Improving Web Search Ranking by Incorporating User Behavior Information", available at least as early as Jun. 13, 2007, at <<http://www.mathcs.emory.edu/~eugene/papers/sigir2006ranking.pdf>>, ACM, 2006, 8 page.

(Continued)

*Primary Examiner*—Debbie Le
(74) *Attorney, Agent, or Firm*—Lee & Hayes, PLLC

(57) ABSTRACT

Procedures for learning and ranking items in a listwise manner are discussed. A listwise methodology may consider a ranked list, of individual items, as a specific permutation of the items being ranked. In implementations, a listwise loss function may be used in ranking items. A listwise loss function may be a metric which reflects the departure or disorder from an exemplary ranking for one or more sample listwise rankings used in learning. In this manner, the loss function may approximate the exemplary ranking for the plurality of items being ranked.

17 Claims, 2 Drawing Sheets

OTHER PUBLICATIONS

Cao, et al., "Learning to Rank: From Pairwise Approach to Listwise Approach", retrieved on Jun. 14, 2007, at <<http://research.microsoft.com/research/pubs/view.aspx?0rc=p&type=technical+report&id=1282>>, Microsoft Corporation, 2007, 1 page.

Carterette, et al., "Learning a Ranking from Pairwise Preferences", available at least as early as Jun. 13, 2007, at <<http://ciir.cs.umass.edu/~carteret/sigir06-poster.pdf>>, ACM, 2006, 2 page.

Fagin, et al., Comparing Top k Lists: Siam J. Discrete Math, vol. 17, No. 1, 2003, pp. 134-160.

Mashiach, "Learning to Rank: A Machine Learning Approach to Static Ranking", available at least as early as Jun. 13, 2007, at <<http://www.cs.technion.ac.il/~litalma/notes_lectures/LearningtoRank.pdf>>, 2006, 5 pages.

Pessiot, et al., "Learning to rank for collaborative filtering", available at least as early as Jun. 13, 2007, at <<http://connex.lip6.fr/~pessiot/papiers/iceis_2007.pdf>>, 7 pages.

* cited by examiner

LISTWISE RANKING

BACKGROUND

Ranking information is increasingly important as more data becomes available. Thus, while the information exists, such as on the Internet (or the World Wide Web), or is otherwise stored, the information may not be obtainable in an understandable fashion. This is to say, the information desired by a user or an application is not obtained because the search does not retrieve the desired information Comparison methodologies may be problematic as the results may be obtained on a pair-wise basis. For example, when performing a search, the accuracy of the results may be determined based on how well the obtained item matches an idealized sample. As a result, the returned results may suffer from this type of comparison.

SUMMARY

Procedures for learning and ranking items in a listwise manner are discussed. A listwise methodology may consider a ranked list, of individual items, as a specific permutation of the items being ranked. In implementations, a listwise loss function may be used in ranking items. A listwise loss function may be a metric which reflects the departure or disorder from an exemplary ranking for one or more sample listwise rankings used in learning. In this manner, use of the loss function may result in a listwise ranking, for the plurality of items, that approximates the exemplary ranking.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Accordingly, techniques are described which may provide ranking on a "list basis". For example, the particular order (or arrangement) of ranked items may be considered when ranking items such as documents, email correspondence to be filtered, web site filtering and so on. While searching and document retrieval are discussed, the techniques disclosed herein may be applicable to a variety of situation in which a ranking or ordering of items is at issue.

In implementations, ranking of items may be accomplished using a listwise loss function which may be a metric which indicates the differentiation (e.g., the distribution) between one or more samples rankings and an exemplary ranking which may be considered an idealized ranking of results. For example, a probabilistic methodology may be used, in part, to normalize sample or in question items (e.g., a collection of documents to be ranked) so that the particular order of items within the ranking may more closely match the exemplary ranking in comparison to other methodologies. Exemplary probabilistic methodologies may include, but are not limited to a permutation probability, a top k probability and so on. A listwise basis may result in a more accurate match between an ordered sample query or an in question ordered set of items and the exemplary ranking in comparison to a pairwise basis in which individual items are compared with a standard, scored and arranged based on the per item score. In the present discussion, the items may be ordered in a manner such that the order (e.g., the particular permutation of results) may approximate that of the exemplary ranking.

Exemplary Environment

Figure 1:
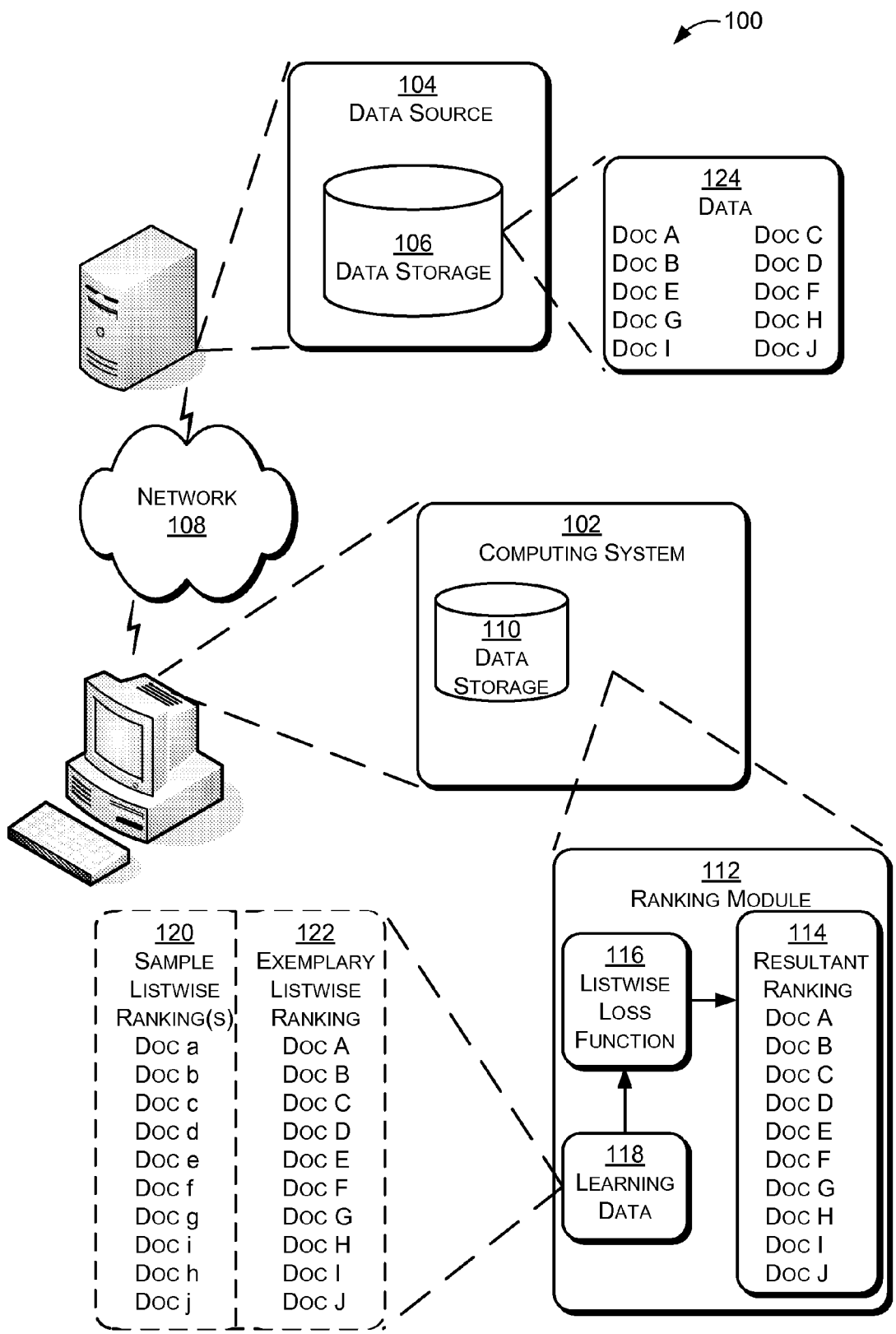
FIG. 1 illustrates an environment in exemplary implementations that may use listwise ranking to provide ranked search results.

FIG. 1 illustrates an environment 100 in an exemplary implementation that is operable to provide listwise ranking. For instance, the system and techniques may permit one or more of document retrieval, filtering (such as spam, or unwanted material filtering), expert finding, sentiment analysis and so on, using listwise ranking and learning techniques. Listwise ranking, and the underlying learning techniques and algorithms, may promote increase functionality and/or accuracy for the foregoing procedures. As will be apparent, the computing system 102 may implement various combinations of the techniques discussed herein. Although particular algorithms are discussed herein, it will be apparent that the techniques discussed are applicable in various situations and utilized in different combinations.

While the present discussion describes the subject matter with respect to searching for documents or pages on the Internet (e.g., a data source 104, having data storage capability 106 over a network 108), the principles discussed herein may be used in a variety of situations in which ranked accuracy is desired. For example, the techniques discussed herein may be used to rank retrieved files stored in local data storage 110 or for use in blocking unwanted electronic correspondence.

In the present instance, a computing system may be configured to apply list based ranking methodologies in order to obtain a listwise loss function. The listwise loss function may be used to increase the ranking accuracy for an in question set of items. The listwise loss function may be obtained from ranking module training. A neural network descent or a gradient descent may be used for teaching the ranking module. For example, a ranking module may use a listwise loss function, obtained from comparing training samples to an exemplary listwise ranking, to order Internet (i.e., the World Wide Web) search results. A listwise ranking may be a particular permutation for a set of items. The accuracy of particular ranking (a subject listwise ranking) may be based on how closely the ordered list matches that of the exemplary ranked list. For example, a test listwise ranking may form a particular permutation (such as a search for documents or web pages) which may be compared on a pairwise basis to the exemplary listwise ranking. This comparison may be used to determine a listwise loss function which is a metric of how disordered the subject listwise ranking is from the presumed good set (i.e., the exemplary listwise ranking). In further instances, in question searches may be used as well for learning purposed. The ranking module may use the listwise loss function to order items so that the ranking more closely matches or approximates the exemplary listwise ranking. In this way, ranked sets of items may be compared, rather than comparing individual items from the subject set to a standard.

In contrast, pairwise analysis may involve comparing a sample to a standard and then ordering the items based on how closely the sample matches the standard. A pairwise ranking may result in a tight coupling with the classification of the item rather than return a response which ordered or ranked is considered. Pairwise rankings may be biased in-favor of rankings having larger sample instances (e.g., document pairs). In addition, the relative order of the results compared in the foregoing fashion may vary (i.e., different permutations).

While a human graded exemplary listwise ranking is described, various techniques may be used to generate an idealized or a ranking list which is assigned as a "ground truth". For example, the exemplary listwise ranking may be used for deriving a ranking function which is obtained from the exemplary listwise ranking and a subject listwise ranking which may be empirically obtained.

In a highly simplified example, a ranking module 112, using the techniques discussed herein, may use to generate a resultant ranking 114 on a listwise basis for query documents "A-J". A listwise loss function 116, as discussed herein, may be used in ranking the documents on a listwise basis. The listwise loss function may be derived from learning data 118, which may include sample listwise rankings 120 in comparison to an exemplary listwise ranking 122. The listwise loss function may be used in ranking unordered "A-J" documents.

In implementations, the ranking module may use a training set of queries $Q=\{q^{(1)}, q^{(2)}, \ldots, q^{(m)}\}$ in which individual queries $q^{(i)}$ within the set are associated with a list of documents (or items) $d^{(i)}=(d_1^{(i)}, d_2^{(i)}, \ldots, d_{n^{(i)}})$, where $d_j^{(i)}$ denotes the j-th document and $n^{(i)}$ denotes the sizes of $d^{(i)}$. This is to say, that for individual queries used to train the ranking module, the individual query may return an ordered list of items (documents) which reflect the ordered "closeness" or accuracy of the items to the particular individual query. In this manner, the set, and the particular order of the items, within the set may be considered, rather than merely considering how close an individual item matches the standard. As a result, the overall set (e.g., a training set) may match the order of the exemplary listwise ranking. Individual list of documents $d^{(i)}$ may be associated with a list of judgments (scores) $y^{(i)}=(y_1^{(i)}, y_2^{(i)}, \ldots, y_{n^{(i)}}^{(i)})$ where $y_j^{(i)}$ denotes the judgment of the item or document $d_j^{(i)}$ with respect to query $q^{(i)}$. The judgment $y_j^{(i)}$ may be a score which represent the degree of relevance for $d_j^{(i)}$ (the document) with respect to the particular query $q^{(i)}$, and may be a score explicitly or implicitly assigned by a human grader which is presumed to be accurate.

For example, $y_j^{(i)}$ can be the number of times a web page was selected or "clicks" on $d_j^{(i)}$ when $d_j^{(i)}$ is retrieved and returned for query $q^{(i)}$ at for search engine. The association being that more often the particular document or page is "click-on" the more relevant the item is to the query. Thus, the rate may be observed for $d_j^{(i)}$ and $q^{(i)}$ the stronger relevance exists between them.

A feature vector $x_j^{(i)}=\Psi(q^{(i)}, d_j^{(i)})$ may be applied to individual query-document pair(s) $(q^{(i)}, d_j^{(i)})$, $i=1, 2, \ldots, m; j=1, 2, \ldots, n^{(i)}$. Thus, a list of features $x^{(i)}=(x_1^{(i)}, \ldots, x_{n^{(i)}}^{(i)})$ and the corresponding list of scores $y^{(i)}=(y_1^{(i)}, \ldots, y_{n^{(i)}}^{(i)})$ may form an instance for comparison. The training set may be denoted as: $\Gamma=\{x^{(i)}, y^{(i)}\}_{i=1}^{m}$.

A ranking function $f$; may be generated for the individual feature vector $x_j^{(i)}$ (corresponding to document $d_j^{(i)}$, it outputs a score $f(d_j^{(i)})$. For a list of feature vectors $x^{(i)}$ a list of scores $z^{(i)}=(f(x_1^{(i)}), \ldots, f(x_{n^{(i)}}^{(i)}))$ may be obtained. The objective of training may be to minimize the total losses with respect to the training data (e.g., is there a deviation from the expected?). Thus, training may be used to obtain a ranking function (e.g., a listwise loss function) which may be used to minimize divergence from the exemplary listwise ranking for in question searches. An exemplary loss function may be expressed as:

$$\sum_{i=1}^{m} L(y^{(i)}, z^{(i)}))$$

where L may represent a listwise loss function.

When ranking using the function obtained from the original query $q^{(i')}$ and the searches associated documents $d^{(i')}$ or items are given, a feature vectors $x^{(i')}$ may be derived from the results and use to train the ranking function to assign scores to the documents $d^{(i')}$ for the current search. The documents $d^{(i')}$ may be ranked in descending order of the scores in a listwise manner.

Various probability models may be applied to determine a ranking function. The ranking function may represent a listwise loss function for the summation of "L" above. A list of scores may be mapped to a probability distribution using probability models, with a selected metric indicating the loss distribution between the subject listwise ranking and the exemplary listwise ranking. The metric may be considered a representation of how the listwise ranked results for the subject search diverge from the exemplary listwise ranked results. Exemplary probability models include, but are not limited to, permutation probability and top k probability.

For a permutation probability model, the set of items (e.g., documents) to be ranked may be identified as $1, 2, \ldots, n$. A permutation $\pi$ on the objects is defined as a bijection (e.g., a one-to-one and on to mapping) from $\{1, 2, \ldots, n\}$ to itself. The permutation may be expressed as $\pi=<\pi(1), \pi(2), \ldots, \pi(n)>$. In which, $\pi(j)$ denotes the object at position j in the permutation. The set of possible permutations of n objects (e.g., items) is denoted as $\Omega_n$. "$\Omega_n$" may represent the set of possible (distinct) arrangements of the n items.

For a ranking function which assigns scores to the n objects, s may denote the list of scores $s=(s_1, s_2 \ldots, s_n)$, where $s_j$ is the score of the j-th object. For purposes of the present discussion, the ranking function and the list of scores obtained from the ranking function may be referred to "interchangeably" (in a general sense) to aid in describing the subject matter.

In the present procedure, there may exist some uncertainty in the prediction of ranking lists (permutations) using the ranking function. While individual permutation may be possible, the various permutations may be associated with different likelihood values based on the ranking function. As a result, some individual permutations may be considered more likely to occur in comparison to the other permutations within the set of possible permutations. A permutation probability may be associated with the ranking function to indicate the likelihood of a particular permutation given the ranking list.

As a result, if $\pi$ is a permutation of n objects, and $\phi(.)$ is an increasing and positive function, the probability of permutation $\pi$ given the list of scores s may be represented as:

$$P_s(\pi) = \prod_{j=1}^{n} \frac{\phi(s_{\pi(j)})}{\sum_{k=j}^{n} \phi(s_{\pi(k)})}$$

in which $s_{\pi(j)}$ denotes the score of the item at position j of permutation $\pi$ and $P_s(\pi)$ is the product from j=1 to n.

For a three objects {1,2,3} example having scores $s=(s_1, s_2, s_3)$. The probabilities of permutations $\pi=<1,2,3>$ and $\pi'=<3,2,1>$ may be represented as:

$$P_s(\pi) = \frac{\phi(s_1)}{\phi(s_1)+\phi(s_2)+\phi(s_3)} \cdot \frac{\phi(s_2)}{\phi(s_2)+\phi(s_3)} \cdot \frac{\phi(s_3)}{\phi(s_3)};$$

$$P_s(\pi') = \frac{\phi(s_3)}{\phi(s_1)+\phi(s_2)+\phi(s_3)} \cdot \frac{\phi(s_2)}{\phi(s_2)+\phi(s_1)} \cdot \frac{\phi(s_1)}{\phi(s_1)}.$$

The permutation probabilities $P_s(\pi)$, $\pi \in \Omega_n$ may form a probability distribution over the set of permutations, that is to say, for each $\pi \in \Omega_n$, $P_s(\pi) > 0$, and $$\sum_{\pi \in \Omega_n} P_s(\pi) = 1.$$

Given any two permutations $\pi$ and $\pi' \in \Omega_n$, if: (1) $\pi(p)=\pi'(q)$; $\pi(q)=\pi'(p)$; $p<q$; (2) $\pi(r)=\pi'(r)$; $r \neq p,q$; (3) $s_{\pi(p)} > s_{\pi(q)}$; then $P_s(\pi) > P_s(\pi')$. For the n objects, if $s_1 > s_2 > \ldots > s_n$, then $P_s(<1, 2, \ldots, n>)$ is the highest permutation probability and $P_s(<n, n-1, \ldots, 1>)$ is the lowest permutation probability among the permutation probabilities of the n objects. Thus, the formula: $\pi$ and $\pi' \in \Omega_n$ indicates that, for a permutation in which an object or item with a larger score is ranked ahead of another object (item) with a smaller score, if the respective positions (of the items in the listwise ranking) are changed, the permutation probability of the resulting permutation will be lower than that of the original permutation.

As a result, if $s_1 > s_2 > \ldots > s_n$, then $P_s(<1, 2, \ldots, n>)$ indicates given the scores of n objects, the list of objects sorted in descending order of the scores may have the highest permutation probability, while the list of objects sorted in ascending order may have the lowest permutation probability (in comparison to each other). Thus, a listwise ranking in which the particular arrangement of scores are ordered in descending order may occur more frequently than an ascending list in which the (relatively) highest match is at the terminal position in the list.

For a linear function $\phi(x)=\alpha x$; $\alpha>0$, the permutation probability may not vary with scale:

$$P_s(\pi) = \prod_{j=1}^{n} \frac{\phi(s_{\pi(j)})}{\sum_{k=j}^{n} \phi(s_{\pi(k)})} = P_{\lambda s}(\pi) = \prod_{j=1}^{n} \frac{\phi(\lambda s_{\pi(j)})}{\sum_{k=j}^{n} \phi(\lambda s_{\pi(k)})};$$

in which $\forall \lambda > 0$. Here $\lambda s$ may be individual components of score list "s" which is multiplied by a positive constant $\lambda$.

For exponential function $\phi(x)=\exp(x)$, the permutation probability may not vary with translation:

$$P_s(\pi) = \prod_{j=1}^{n} \frac{\phi(s_{\pi(j)})}{\sum_{k=j}^{n} \phi(s_{\pi(k)})} = P_{\lambda+s}(\pi) = \prod_{j=1}^{n} \frac{\phi(\lambda + s_{\pi(j)})}{\sum_{k=j}^{n} \phi(\lambda + s_{\pi(k)})}$$

$\forall \lambda \in \Re$. In which, $\lambda+s$ indicates a constant added (individually) to an individual components of score list $\lambda$.

Thus, for two lists of scores (used in a listwise comparison in which the listwise rankings are compared), the two corresponding permutation probability distributions may be calculated, and the metric between the two distributions may be taken as a listwise loss function representing the deviation from idealization for the subject listwise permutation. Since the number of permutations is on the order of O(n!) ("O" times "n" factorial), the calculation may be problematic to calculate in practice. The calculation may problematic because of the extent of the calculation, in comparison to other techniques.

Following a top k probability model, the top k probability of items or objects $(j_1, j_2, \ldots, j_k)$ may represent the probability of the item or object being ranked in the top k positions for the given the scores of the objects. The top k subgroup of permutations may be the top k subgroup $G_k(j_1, j_2, \ldots, j_k)$ containing the permutations in which the top k objects are ordered $(j_1, j_2, \ldots, j_k)$:

$G_k(j_1, j_2, \ldots, j_k) = \{\pi \in \Omega_n | \pi(t)=j_t, \forall t=1, 2, \ldots, k\};$ and $G_k$ is the collection of all top k subgroups:

$G_k = \{G_k(j_1, j_2, \ldots, j_k) | j_t=1, 2, \ldots, n, \forall t=1, 2, \ldots, k,$ and $j_u \neq j_v, \forall u \neq v\}$ Thus for the group, there may be $$\frac{n!}{(n-k)!}$$

elements in the collection $G_k$. As a result of this methodology, the result may be much smaller than the number of elements in $\Omega_n$ for the permutation probability approach discussed above.

The top k probability of objects $(j_1, j_2, \ldots, j_k)$ may be the probability of subgroup $G_k(j_1, j_2, \ldots, j_k)$:

$$P_s(G_k(j_1, j_2, \ldots, j_k)) = \sum_{\pi \in G_k(j_1, j_2, \ldots, j_k)} P_s(\pi);$$

in which $P_s(\pi)$ is permutation probability of $\pi$ given s. Thus, the top k probability of objects $(j_1, j_2, \ldots, j_k)$ may equal the sum of the permutation probabilities of permutations in which objects $(j_1, j_2, \ldots, j_k)$ are ranked in the top k positions.

While $$\frac{n!}{(n-k)!}$$

for top k probabilities may be calculated in the above approach, in further implementations, the following approach may be implemented.

For top k probability $P_s(G_k(j_1, j_2, \ldots, j_k))$, $$P_s(G_k(j_1, j_2, \ldots, j_k)) = \prod_{t=1}^{k} \frac{\phi(s_{j_t})}{\sum_{l=t}^{n} \phi(s_{j_l})},$$

in which $s_{j_t}$ is the score of object $j_t$ which is ranked in position $t$, $t=1, 2, \ldots, n$. The top k probabilities may form a probability distribution over collection $G_k$, so that given any two objects $j_u$, and $j_v$, if $s_{j_u} > s_{j_v}$, $u \neq v, u,v = 1, 2, \ldots, n$, then $P_s(G_k(j_1, \ldots, j_u, \ldots, j_v, \ldots, j_k)) > P_s(G_k(j_1, \ldots, j_v, \ldots, j_u, \ldots, j_k))$. The foregoing top k model may not vary with scale or translation, for a carefully designed function $\phi(.)$.

As a result, a metric between the corresponding top k probability distributions may be implemented as a listwise loss function for use in determining the accuracy for a listwise ranking.

For example, when using cross entropy as a metric (in which the metric indicates the tendency towards "disorder"), the listwise loss function $$"\sum_{i=1}^{m} L(y^{(i)}, z^{(i)}))"$$

(above) may be expressed as:

$$L(y^{(i)}, z^{(i)}) = -\sum_{\forall g \in G_k} P_{y^{(i)}}(g) \log(P_{z^{(i)}}(g))$$

While other methodologies may be utilized (such as permutation probability methodologies discussed above), a learning method may be utilized for optimizing the listwise loss function based on top k probability, using neural network modeling and gradient descent as optimization algorithm. Continuing the example above, if the ranking module is used when searching the Internet or a database for relevant documents or items, the ranking module may employ a ranking function based on a neural network model. For the neural network ranking function: $\omega$ as $f_\omega$, wherein a feature vector $x_j^{(i)}$, $f_\omega(x_j^{(i)})$ is used in scoring. If $\phi$ in $$P_s(\pi) = \prod_{j=1}^{n} \frac{\phi(s_{\pi(j)})}{\sum_{k=j}^{n} \phi(s_{\pi(k)})}$$

is set as an exponential function which may not vary with translation (as discussed above). The top k probability may be expressed as:

$$P_s(G_k(j_1, j_2, \ldots, j_k)) = \prod_{t=1}^{k} \frac{\exp(s_{j_t})}{\sum_{l=t}^{n} \exp(s_{j_l})}$$

Given a query $q^{(i)}$, the ranking function $f_\omega$ can generate a score list $z^{(i)}(f_\omega) = (f_\omega(x_1^{(i)}), f_\omega(x_2^{(i)}), \ldots, f_\omega(x_{n^{(i)}}^{(i)}))$. In which, the top k probability of documents $(d_{j_1}^{(i)}, d_{j_2}^{(i)}, \ldots, d_{j_t}^{(i)})$ may be calculated as:

$$P_{z^{(i)}(f_\omega)}(G_k(j_1, j_2, \ldots, j_k)) = \prod_{t=1}^{k} \frac{\exp(f_\omega(x_{j_t}^{(i)}))}{\sum_{l=t}^{n} \exp(f_\omega(x_{j_l}^{(i)}))}$$

With Cross Entropy as metric, the loss for query $q^{(i)}$ may be expressed as:

$$L(y^{(i)}, z^{(i)}(f_\omega)) = -\sum_{\forall g \in G_k} P_{y^{(i)}}(g) \log(P_{z^{(i)}(f_\omega)}(g))$$

In which "$\forall g \in G_k$" indicates that each element g is an element of collection $G_k$ (e.g., the top k subgroup).

The gradient of $L(y^{(i)}, z^{(i)}(f_\omega))$ with respect to parameter $\omega$ can be calculated as:

$$\Delta\omega = \frac{\partial L(y^{(i)}, z^{(i)}(f_\omega))}{\partial \omega} = -\sum_{\forall g \in G_k} \frac{\partial P_{z^{(i)}(f_\omega)}(g)}{\partial \omega} \frac{P_{y^{(i)}}(g)}{P_{z^{(i)}(f_\omega)}(g)}$$

The above calculation being the gradient descent with respect to $$\sum_{i=1}^{m} L(y^{(i)}, z^{(i)}))$$

for use in determining a listwise loss function for training the ranking module. In the foregoing manner, the module may optimize a listwise ranking for the subject items.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., tangible memory and so on.

The following discussion describes transformation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Exemplary Procedures

The following discussion describes a methodology that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Figure 2:
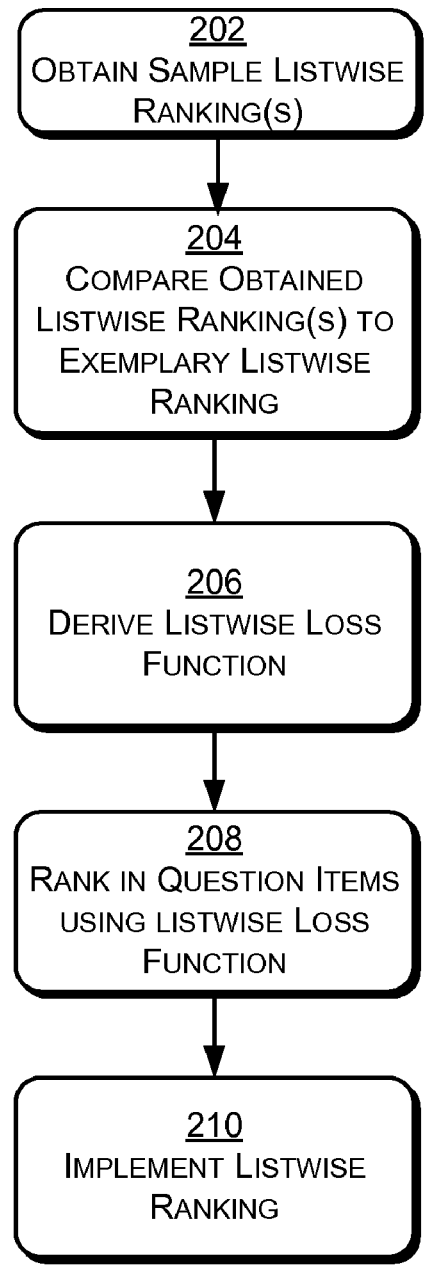
FIG. 2 is a flow diagram depicting a procedure in exemplary implementations in which a listwise loss function is used in ranking items.

FIG. 2 discloses exemplary procedures for ranking and associated learning on a listwise basis. The techniques discussed herein may be used to obtain a list of ranked results for a variety of situations. Examples may include, but are not limited to, database searching, searching the Internet or other networks, filtering and so on in which results may be returned in a ranked manner.

A sample listwise ranking may be obtained 202, such as from a sample or learning search, and compared 204 to an exemplary listwise ranking such as for use in training. For example, the sample listwise ranking may be a ranked or ordered set of sample or training items or documents. For example, a training set may include four individual items which are ranked in descending order based on the relevancy of the items.

The comparison 202 may be used to derive 204 a listwise loss function which generally indicates how the set of ranked results differs from an exemplary listwise ranking (e.g., how the obtained list is disordered from the exemplary list). Thus, the metric may be applied in subsequent situations so that a resultant ranking may more closely match an expected or exemplary ranking. For example, the listwise loss function may indicate how the obtained ranking is disordered from the exemplary ranking. In a simplistic example, if the exemplary ranking is "A, B, C, D, E, F, G" and the obtained ranking is "A, B, C, D, F, E, G" the listwise loss function may generally represent the disorder in the ranking of items "E and F" on a listwise basis.

In implementations, comparing 202 the sample listwise ranking (of individual items) may be used with a training set of queries $Q=\{q^{(1)}, q^{(2)}, \ldots, q^{(m)}\}$ in which the individual queries $q^{(1)}$ within the list are associated with a list of documents (or items) $d^{(i)}=(d_1^{(i)}, d_2^{(i)}, \ldots, d_{n^{(i)}}^{(i)})$, where $d_j^{(i)}$ denotes the j-th document and $n^{(i)}$ denotes the sizes of $d^{(i)}$. During training, the comparison 202 may return an ordered list of items (documents) which reflect the ordered "closeness" or accuracy of the items to the particular individual query. As a result, the listwise ranking may be considered, instead of merely considering how close an individual item matches the standard. As a result, the overall set may match or more nearly match the order of the exemplary listwise ranking than other methodologies. Individual list of documents $d^{(i)}$ may be associated with a list of judgments (scores) $y^{(i)}=(y_1^{(i)}, y_2^{(i)}, \ldots, y_{n^{(i)}}^{(i)})$ where $y_j^{(i)}$ denotes the judgment of the item or document $d_j^{(i)}$ with respect to query $q^{(i)}$. The judgment $y_j^{(i)}$ may be a score which represent the degree of relevance for $d_j^{(i)}$ (the document) with respect to the particular query $q^{(i)}$, and may be a score explicitly or implicitly assigned by a human grader which is presumed to be accurate.

For example, $y_j^{(i)}$ can be the number of times a web page was selected or "clicks" on $d_j^{(i)}$ when $d_j^{(i)}$ is retrieved and returned for query $q^{(i)}$ at for search engine. The association being that more often the particular document or page is "click-on" the more relevant the item is to the query. Thus, the rate may be observed for $d_j^{(i)}$ and $q^{(i)}$ the stronger relevance exists between them.

A feature vector $x_j^{(i)}=\Psi(q^{(i)}, d_j^{(i)})$ may be applied to individual query-document pair(s) $(q^{(i)}, d_j^{(i)})$, $i=1, 2, \ldots, m; j=1, 2, \ldots, n^{(i)}$. Thus, a list of features $x^{(i)}=(x_1^{(i)}, \ldots, x_{n^{(i)}}^{(i)})$ and the corresponding list of scores $y^{(i)}=(y_1^{(i)}, \ldots, y_{n^{(i)}}^{(i)})$ may be a point of comparison. The training set may be denoted as $\Gamma=\{x^{(i)}, y^{(i)}\}_{i=1}^{m}$.

A ranking function $f$; may be generated for the individual feature vector $x_j^{(i)}$ (corresponding to document $d_j^{(i)}$, it outputs a score $f(d_j^{(i)})$. For a list of feature vectors $x^{(i)}$, a list of scores $z^{(i)}=(f(x_1^{(i)}), \ldots, f(x_{n^{(i)}}^{(i)}))$ may be obtained. The objective of training may be to minimize the total losses with respect to the learning data (e.g., is there a deviation from the expected?). Thus, learning may be used to obtain a listwise loss function which may minimize divergence, of an in question listwise plurality of items or, in this case, documents, from the exemplary listwise ranking. An exemplary loss function may be expressed as:

$$\sum_{i=1}^{m} L(y^{(i)}, z^{(i)}))$$

where L may represent a listwise loss function.

When ranking using the function obtained from the original query $q^{(i')}$ and the searches associated documents $d^{(i')}$ or items are given, a feature vectors $x^{(i')}$ may be derived from the results and use to train the ranking function to assign scores to the documents $d^{(i')}$ for the current search. The (items) documents $d^{(i')}$ (from the current search) may be ranked in descending order of the scores in a listwise manner.

As discussed previously respect to FIG. 1, various probability models may be applied to determine a loss function for the summation of "L" above when comparing sample listwise rankings with the exemplary listwise ranking. A list of scores may be mapped to a probability distribution using probability models, with a selected metric indicating the loss distribution between the subject listwise ranking and the exemplary listwise ranking. The metric may be considered a representation of how the listwise ranked results for the subject search diverge from the exemplary listwise ranking. While implementations using a top k probability are discussed, other models may be used. For example, a permutation probability model may be used. In this way, a listwise loss function may be calculated based on the comparison of leaning sample set and the exemplary listwise ranking.

For a permutation probability model, the set of items (e.g., documents) to be ranked may be identified as $1, 2, \ldots, n$. A permutation $\pi$ on the objects is defined as a bijection (e.g., a one-to-one and on to mapping) from $\{1, 2, \ldots, n\}$ to itself. The permutation may be expressed as $\pi=<\pi(1), \pi(2), \ldots, \pi(n)>$. In which, $\pi(j)$ denotes the object at position j in the permutation. The set of possible permutations of n objects (e.g., items) is denoted as $\Omega_n$. "$\Omega_n$" may represent the set of possible (distinct) arrangements of the n items.

For a ranking function which assigns scores to the n objects, s may denote the list of scores $s=(s_1, s_2, \ldots, s_n)$, where $s_j$ is the score of the j-th object.

Following a top k probability model, as discussed above with respect to FIG. 1, the top k probability of items or objects $(j_1, j_2, \ldots, j_k)$ may represent the probability of the item or object being ranked in the top k positions for the given the scores of the objects. The top k subgroup of permutations may be the top k subgroup $G_k(j_1, j_2, \ldots, j_k)$ containing the permutations in which the top k objects are ordered $(j_1, j_2, \ldots, j_k)$:

$$G_k(j_1, j_2, \ldots, j_k) = \{\pi \in \Omega_n | \pi(t) = j_t, \forall t=1, 2, \ldots, k\};$$

and $G_k$ is the collection of all top k subgroups:

$$G_k = \{G_k(j_1, j_2, \ldots, j_k) | j_t = 1, 2, \ldots, n, \forall t=1, 2, \ldots, k, \text{ and } j_u \neq j_v, \forall u \neq v\}$$

Thus, for the group there may be $$\frac{n!}{(n-k)!}$$

elements in the collection $G_k$. As a result of this methodology, the result may be much smaller than the number of elements in $\Omega_n$ for the permutation probability approach discussed above.

The top k probability of objects $(j_1, j_2, \ldots, j_k)$ may be the probability of subgroup $G_k(j_1, j_2, \ldots, j_k)$:

$$P_s(G_k(j_1, j_2, \ldots, j_k)) = \sum_{\pi \in G_k(j_1, j_2, \ldots, j_k)} P_s(\pi);$$

in which $P_s(\pi)$ is permutation probability of $\pi$ given s. Thus, the top k probability of objects $(j_1, j_2, \ldots, j_k)$ may equal the sum of the permutation probabilities of permutations in which objects $(j_1, j_2, \ldots, j_k)$ are ranked in the top k positions.

While $$\frac{n!}{(n-k)!}$$

for top k probabilities may be calculated in the above approach, in further implementations, the following approach may be implemented.

For top k probability $P_s(G_k(j_1, j_2, \ldots, j_k))$, $$P_s(G_k(j_1, j_2, \ldots, j_k)) = \prod_{t=1}^{k} \frac{\phi(s_{j_t})}{\sum_{l=t}^{n} \phi(s_{j_l})},$$

in which $s_{j_t}$ is the score of object $j_t$ which is ranked in position $t, t = 1, 2, \ldots, n$. The top k probabilities may form a probability distribution over collection $G_k$, so that given any two objects $j_u$ and $j_v$, if $s_{j_u} > s_{j_v}$, $u \neq v$, $u, v = 1, 2, \ldots, n$, then $P_s(G_k(j_1, \ldots, j_u, \ldots, j_v, \ldots, j_k)) > P_s(G_k(j_1, \ldots, j_v, \ldots, j_u, \ldots, j_k))$. The foregoing top k model may not vary with scale or translation, for a carefully designed function $\phi(.)$.

As a result, a metric between the corresponding top k probability distributions may be implemented as a listwise loss function for use in increasing the accuracy for a listwise ranking. The metric may be derived from the sample listwise ranking (one or more may be used) and exemplary listwise rankings.

For example, when using cross entropy as a metric (in which the cross entropy metric indicates the tendency of the in question set towards "disorder" with respect to the exemplary listwise ranking), the listwise loss function $$\text{``} \sum_{i=1}^{m} L(y^{(i)}, z^{(i)}) \text{''}$$

(above) may be expressed as:

$$L(y^{(i)}, z^{(i)}) = -\sum_{\forall g \in G_k} P_{y^{(i)}}(g) \log(P_{z^{(i)}}(g))$$

While other probability methodologies may be utilized when obtaining a loss function from the sample listwise ranking(s) and the exemplary listwise ranking, a learning method may be utilized for optimizing the listwise loss function based on top k probability, using neural network modeling and gradient descent as optimization algorithm. Continuing the top k probability model directly above, a ranking function based on a neural network model may be used. For the neural network ranking function: $\omega$ as $f_\omega$, wherein a feature vector $x_j^{(i)}$, $f_\omega(x_j^{(i)})$ is used in scoring. If $\phi$ in $$P_s(\pi) = \prod_{j=1}^{n} \frac{\phi(s_{\pi(j)})}{\sum_{k=j}^{n} \phi(s_{\pi(k)})}$$

is set as an exponential function which may not vary with translation (as discussed above). The top k probability may be expressed as:

$$P_s(G_k(j_1, j_2, \ldots, j_k)) = \prod_{t=1}^{k} \frac{\exp(s_{j_t})}{\sum_{l=t}^{n} \exp(s_{j_l})}$$

Given a query $q^{(i)}$, the ranking function $f_\omega$ can generate a score list $z^{(i)}(f_\omega) = (f_\omega(x_1^{(i)}), f_\omega(x_2^{(i)}), \ldots, f_\omega(x_{n^{(i)}}^{(i)}))$. In which, the top k probability of documents $(d_{j_1}^{(i)}, d_{j_2}^{(i)}, \ldots, d_{j_k}^{(i)})$ may be calculated as:

$$P_{z^{(i)}(f_\omega)}(G_k(j_1, j_2, \ldots, j_k)) = \prod_{t=1}^{k} \frac{\exp(f_\omega(x_{j_t}^{(i)}))}{\sum_{l=t}^{n} \exp(f_\omega(x_{j_l}^{(i)}))},$$

With Cross Entropy as metric, the loss for query $q^{(i)}$ may be expressed as:

$$L(y^{(i)}, z^{(i)}(f_\omega)) = -\sum_{\forall g \in G_k} P_{y^{(i)}}(g) \log(P_{z^{(i)}(f_\omega)}(g))$$

In which "$\forall g \in G_k$" indicates that each element g is an element of collection $G_k$ (e.g., the top k subgroup).

The gradient of $L(y^{(i)}, z^{(i)}(f_\omega))$ with respect to parameter $\omega$ can be calculated as:

$$\Delta \omega = \frac{\partial L(y^{(i)}, z^{(i)}(f_\omega))}{\partial \omega} = -\sum_{\forall g \in G_k} \frac{\partial P_{z^{(i)}(f_\omega)}(g)}{\partial \omega} \frac{P_{y^{(i)}}(g)}{P_{z^{(i)}(f_\omega)}(g)}$$

The above calculation being the gradient descent with respect to $$\sum_{i=1}^{m} L(y^{(i)}, z^{(i)}))$$

for learning a listwise loss function for training. In the foregoing manner, the method may optimize a listwise ranking for the subject items.

The derived listwise loss function may be used as part of ranking 208 a plurality of items so that the in question ranking approximates the exemplary ranking on a listwise basis. If, a plurality of items are retrieved in a query, the ordered listwise ranking may be arranged so that the overall ranking matches, or otherwise approximates, the exemplary listwise ranking. In this manner, the subject ranking may avoid the issues experienced with a pairwise methodology in which the ranked order of the items may vary. Thus, the listwise loss function may be applied to a set including a plurality of items so that the obtained ranking approximates (e.g., matches or more closely matches the example ranking than other methodologies). Thus, the subject ranking may be ranked using the listwise loss function to "correct" for differences from the expected example listwise function. The ranked in question plurality of items may be implemented 210 such as by presenting the ranking to a user, exporting the ranking to an application and so on.

In additional implementations procedures and computer readable-media including computer-executable instructions that may direct a computer to perform the discussed procedures are discussed. The present techniques may be used when ranking a plurality of items. The ranking may be achieved using a listwise loss function which may be a learned metric representing the cross entropy or the tendency away from order (e.g., the exemplary listwise ranking) for one or more sample listwise rankings. The listwise loss function may be obtained as described above with respect to FIGS. 1 and 2. For example, the listwise loss function may implement a permutation probability approach, a top k probability approach or other methodologies. For example, when filtering for unwanted electronic correspondence, the individual correspondences may be ranked using the listwise loss function obtained via a learning methodology. In this way, the in question listwise ranking may match or approximately match the exemplary listwise ranking on a listwise basis.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   deriving a listwise loss function from one or more sample listwise rankings, individual listwise rankings including individual items ordered based on the relevancy of the individual items, with respect to an exemplary listwise ranking; and
   using a computing device, ranking a plurality of items using the listwise loss function, wherein the listwise loss function is:

$$L(y^{(i)}, z^{(i)}(f_\omega)) = -\sum_{\forall g \in G_k} P_{y^{(i)}}(g) \log(P_{z^{(i)}(f_\omega)}(g));$$

in which:
$y^{(i)}$ is a judgement value for an item with respect to a query;
$P_{y^{(i)}}$ is a probability of $y^{(i)}$;
$z^{(i)}$ is a list of scores for $y^{(i)}$ with a neural network model function $f_\omega$ applied to individual $y^{(i)}$ according to an equation $$z^{(i)} = (f(x_1^{(i)}), \ldots, f(x_{n(i)}^{(i)}));$$

$P_{z^{(i)}(f_\omega)}$ is a probability of $z^{(i)}$; and $$-\sum_{\forall g \in G_k} P_{y^{(i)}}(g) \log(P_{z^{(i)}(f_\omega)}(g))$$

is a cross entropy for the query "$q^{(i)}$" in which $G_k$ is a top k subgroup for the query and g is an element of collection $G_k$.

2. The method as described in claim 1 wherein the plurality of items are ordered from most relevant to least relevant for a query.

3. The method as described in claim 1 wherein ranking is at least one of document retrieval, filtering, expert finding, spam filtering, or sentiment analysis.

4. The method as described in claim 1 wherein ranking is accomplished for a set of queries, the individual queries in the set being associated with a list of documents, the individual list of documents being associated with a list of scores for the individual documents within the list of documents.

5. The method as described in claim 1 wherein the listwise loss function is a cross entropy loss metric.

6. The method as described in claim 1, wherein the gradient of $L(y^{(i)}, z^{(i)}(f_\omega))$ is: $\Delta \omega =$ $$\frac{\partial L(y^{(i)}, z^{(i)}(f_\omega))}{\partial \omega} = -\sum_{\forall g \in G_k} \frac{\partial P_{z^{(i)}(f_\omega)}(g)}{\partial \omega} \frac{P_{y^{(i)}}(g)}{P_{z^{(i)}(f_\omega)}(g)}.$$

7. The method as described in claim 6 wherein the ranking of the plurality of items is accomplished on a pairwise basis with the exemplary listwise ranking.

8. The method as described in claim 1 wherein the listwise loss function is calculated using at least one of a permutation probability model or a top k probability model.

9. One or more computer-readable storage media comprising computer-executable instructions that, when executed, direct a computing system to:
   rank a plurality of items on a listwise basis using a listwise loss function wherein the listwise loss function is:

$$L(y^{(i)}, z^{(i)}(f_\omega)) = -\sum_{\forall g \in G_k} P_{y^{(i)}}(g) \log(P_{z^{(i)}(f_\omega)}(g)),$$

wherein:

$y^{(i)}$ is a judgement value for an item with respect to a query;

$P_{y^{(i)}}$ is a probability of $y^{(i)}$;

$z^{(i)}$ is a list of scores for $y^{(i)}$ with a neural network model function $f_\omega$ applied to individual $y^{(i)}$ according to an equation $$z^{(i)} = (f(x_1^{(i)}), \ldots, f(x_{n^{(i)}}^{(i)}));$$

$P_{z^{(i)}(f_\omega)}$ is a probability of $z^{(i)}$; and $$-\sum_{\forall g \in G_k} P_{y^{(i)}}(g) \log(P_{z^{(i)}(f_\omega)}(g))$$

is a cross entropy for the query "$q^{(i)}$", in which $G_k$ is a top k subgroup for the query and g is an element of collection $G_k$.

10. The one or more computer-readable media as described in claim 9 wherein the listwise loss function is a probability loss metric between one or more sample rankings and an exemplary listwise ranking.

11. The one or more computer-readable media as described in claim 9, wherein the gradient of $L(y_{(i)}, z^{(i)}(f_\omega))$ is:

$$\Delta\omega = \frac{\partial L(y^{(i)}, z^{(i)}(f_\omega))}{\partial \omega} = -\sum_{\forall g \in G_k} \frac{\partial P_{z^{(i)}(f_\omega)}(g)}{\partial \omega} \frac{P_{y^{(i)}}(g)}{P_{z^{(i)}(f_\omega)}(g)}.$$

12. The one or more computer-readable media as described in claim 9 wherein the instructions are configured for at least one of document retrieval, filtering, expert finding, spam filtering, or sentiment analysis.

13. The one or more computer-readable media as described in claim 9 wherein the listwise loss function is calculated using at least one of a permutation probability model or a top k probability model.

14. The one or more computer-readable media as described in claim 9 wherein the listwise basis is a specific ranked order of items.

15. A system comprising:
a processing device to facilitate calculation of one or more functions;
a search module configured to apply a listwise loss function to a plurality of items, in which the listwise loss function indicates a listwise difference between a previous listwise ranking and an exemplary listwise ranking, wherein the listwise loss function is:

$$L(y^{(i)}, z^{(i)}(f_\omega)) = -\sum_{\forall g \in G_k} P_{y^{(i)}}(g) \log(P_{z^{(i)}(f_\omega)}(g)),$$

wherein:

$y^{(i)}$ is a judgement value for an item with respect to a query;

$P_{y^{(i)}}$ is a probability of $y^{(i)}$;

$z^{(i)}$ is a list of scores for $y^{(i)}$ with a neural network model function $f_\omega$ applied to individual $y^{(i)}$ according to an equation $$z^{(i)} = (f(x_1^{(i)}), \ldots, f(x_{n^{(i)}}^{(i)}));$$

$P_{z^{(i)}(f_\omega)}$ is a probability of $z^{(i)}$; and $$-\sum_{\forall g \in G_k} P_{y^{(i)}}(g) \log(P_{z^{(i)}(f_\omega)}(g))$$

is a cross entropy for the query "$q^{(i)}$", in which $G_k$ is a top k subgroup for the query and g is an element of collection $G_k$.

16. The system of claim 15, wherein the loss function is a cross entropy based gradient descent.

17. The system of claim 15, wherein the gradient of $L(y^{(i)}, z^{(i)}(f_\omega))$ is:

$$\Delta\omega = \frac{\partial L(y^{(i)}, z^{(i)}(f_\omega))}{\partial \omega} = -\sum_{\forall g \in G_k} \frac{\partial P_{z^{(i)}(f_\omega)}(g)}{\partial \omega} \frac{P_{y^{(i)}}(g)}{P_{z^{(i)}(f_\omega)}(g)}.$$

* * * * *

UNITED STATES PATENT AND TRADEMARK OFFICE
CERTIFICATE OF CORRECTION

PATENT NO. : 7,734,633 B2 Page 1 of 1
APPLICATION NO. : 11/874813
DATED : June 8, 2010
INVENTOR(S) : Tie-Yan Liu et al.

It is certified that error appears in the above-identified patent and that said Letters Patent is hereby corrected as shown below:

In column 15, line 29, in Claim 11, delete " $L(y_{(i)}, z^{(i)}(f_\omega))$ " and insert -- $L(y^{(i)}, z^{(i)}(f_\omega))$ --, therefor.

Signed and Sealed this
Fifteenth Day of February, 2011

David J. Kappos
*Director of the United States Patent and Trademark Office*